(12) United States Patent
Ee et al.

(10) Patent No.: US 10,068,595 B2
(45) Date of Patent: Sep. 4, 2018

(54) DISK DRIVE SUSPENSION TRI-STAGE ACTUATOR HAVING PSEUDO FEATURE INTEGRALLY CONSTRUCTED ON TRACE GIMBAL

(71) Applicant: Magnecomp Corporation, Murrieta, CA (US)

(72) Inventors: Kuen Chee Ee, Chino, CA (US); Long Zhang, Murrieta, CA (US); David Glaess, Pakkret (TH)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 15/668,594

(22) Filed: Aug. 3, 2017

(65) Prior Publication Data

US 2018/0040343 A1    Feb. 8, 2018

Related U.S. Application Data

(60) Provisional application No. 62/371,690, filed on Aug. 5, 2016.

(51) Int. Cl.
*G11B 5/48* (2006.01)
*G11B 5/596* (2006.01)

(52) U.S. Cl.
CPC ............ *G11B 5/483* (2015.09); *G11B 5/4833* (2013.01); *G11B 5/4873* (2013.01); *G11B 5/596* (2013.01)

(58) Field of Classification Search
None
See application file for complete search history.

(56) References Cited

U.S. PATENT DOCUMENTS

| 7,459,835 | B1  | 12/2008 | Mei et al. |  |
|---|---|---|---|---|
| 8,228,642 | B1 | 7/2012 | Hahn et al. | |
| 8,559,138 | B1 * | 10/2013 | Hahn et al. | G11B 5/4873 360/294.4 |
| 8,654,482 | B1 * | 2/2014 | Hahn et al. | G11B 5/4873 360/294.4 |
| 8,810,971 | B1 | 8/2014 | Vitikkate et al. | |
| 8,879,210 | B1 | 11/2014 | Hahn et al. | |
| 9,070,394 | B1 * | 6/2015 | Hahn et al. | G11B 5/483 |
| 9,390,738 | B1 * | 7/2016 | Mendonsa et al. | G11B 5/483 |

OTHER PUBLICATIONS

Men, Ligiu et al., "Ferntosecond Laser Trimmed Fiber Taper. For Simultaneous Measurement of Axial Strain and Temperature", IEEE Photonics Technology Letters, vol. 23, No. 5, pp. 320-322, Mar. 1, 2011.

* cited by examiner

*Primary Examiner* — Craig A. Renner
(74) *Attorney, Agent, or Firm* — Nixon Peabody LLP (57) ABSTRACT

A dual stage actuated suspension has a first piezoelectric microactuator on the trace gimbal assembly (TGA), and a pseudo feature located laterally opposite the microactuator. The pseudo feature is formed integrally with the TGA from at least one of the base metal layer, the insulative layer, and the conductive layer that make up the TGA. The pseudo feature helps to balance the suspension. The suspension can optionally have a second microactuator located proximal of the first microactuator in order to perform coarser positioning than the first microactuator, such that the suspension is a tri-stage actuated suspension.

17 Claims, 10 Drawing Sheets

DISK DRIVE SUSPENSION TRI-STAGE ACTUATOR HAVING PSEUDO FEATURE INTEGRALLY CONSTRUCTED ON TRACE GIMBAL

CROSS-REFERENCE TO RELATED APPLICATIONS

This application claims priority from U.S. Provisional Patent Application No. 62/371,690 filed on Aug. 5, 2016, which is hereby incorporated by reference in its entirety.

BACKGROUND OF THE INVENTION

1. Field of the Invention

This invention relates to the field of suspensions for disk drives. More particularly, this invention relates to the field of a disk drive suspension having tri-stage actuation, and having pseudo-symmetry features integrally constructed on the trace gimbal.

2. Description of Related Art

Magnetic hard disk drives and other types of spinning media drives such as optical disk drives are well known. A typical hard disk drive includes a spinning magnetic disk containing a pattern of magnetic ones and zeroes on it that constitutes the data stored on the disk drive. The magnetic disk is driven by a drive motor. The disk drive further includes a disk drive suspension to which a magnetic head slider is mounted proximate a distal end of a load beam. The head slider contains magnetic read transducers and magnetic write transducers to respectively read data from, and write data to, the magnetic disk. The "proximal" end of a suspension or a load beam is the end that is supported, i.e., the end nearest to an actuator arm to which the suspension is attached. The "distal" end of a suspension or load beam is the end that is opposite the proximal end, i.e., the "distal" end is the cantilevered end.

The suspension is typically coupled to an actuator arm, which in turn is coupled to a voice coil motor that moves the suspension arcuately in order to position the head slider over the correct data track on the spinning data disk. The head slider is carried on a gimbal which allows the slider to pitch and roll so that it follows the proper data track on the disk, allowing for such variations as vibrations of the disk, inertial events such as bumping, and irregularities in the disk's surface.

Both single stage actuated disk drive suspensions and dual stage actuated (DSA) suspension are known. In a single stage actuated suspension, only the voice coil motor moves the suspension.

In a DSA suspension, as for example in U.S. Pat. No. 7,459,835 issued to Mei et al. as well as many others, in addition to the voice coil motor which moves the entire suspension, at least one microactuator is located on the suspension in order to effect fine movements of the magnetic head slider to keep it properly aligned over the data track on the spinning disk. The microactuator(s) provide much finer control and much higher bandwidth of the servo control loop than does the voice coil motor alone, which effects relatively coarse movements of the suspension and hence the magnetic head slider. A piezoelectric element, sometimes referred to simply as a PZT, is often used as the microactuator motor, although other types of microactuator motors are possible. In the discussion that follows, for simplicity the microactuator will be referred to simply as a "PZT," although it will be understood that the microactuator need not be of the PZT type.

DSA designs in which the PZT microactuators are located on or at the gimbal have also been proposed. Such designs are generally referred to as "GDA" designs. U.S. Pat. No. 8,879,210 to Hahn et al. and owned by the assignee of the present application shows such a GDA suspension. DSA suspensions having a single microactuator on one lateral side of a suspension and a pseudo feature on the other lateral side in order to counterbalance the single microactuator have also been proposed, such as in U.S. Pat. No. 8,559,138 to Hahn et al. and owned by the assignee of the present application.

Suspensions having tri-stage actuation have also been proposed. U.S. Pat. No. 8,810,971 to Vitikkate et al. purports to disclose a third-stage actuator in a hard disk drive, with the third actuator stage being a co-located and differently-poled PZT device which bends in rotation in response to an actuation voltage being applied to the device.

GDA designs such as the ones shown in U.S. Pat. No. 8,879,210 have been shown to exhibit a servo bandwidth of approximately 4-5 kHz. The continuing trend of increased area data density and tracks per inch (TPI) will continue to require higher servo bandwidths.

SUMMARY OF THE INVENTION

The present invention is of a disk drive suspension having dual-stage or tri-stage actuation, and having a pseudo feature integrally formed on the trace gimbal assembly (TGA) to provide mass and inertial balance to balance out a single microactuator mounted off-center on the TGA.

In one aspect, the invention is of GDA suspension having a single PZT device or simply "PZT" for shorthand used as a microactuator on a first lateral side of the TGA, and a pseudo feature opposite the PZT in generally mirror relation thereto in order to balance out the PZT in mass and stiffness, with the pseudo feature being integrally formed with the TGA as part of the TGA. The pseudo feature is therefore formed of the same layers and materials as is the TGA, which typically includes a metal base layer such as stainless steel, an insulating layer such as polyimide, and a conductive trace layer such as copper or copper alloy, with optionally a coverlayer on top. The pseudo feature will sometimes be referred to herein as a counterbalance, keeping in mind that the counterbalance preferably balances out not only the mass and mass distribution of the PZT but also the stiffness of the PZT. The counterbalance thus preferably balances out both static and dynamic properties of the PZT. Because the counterbalance according to the present invention is integrally formed with the TGA, it is not necessary to separately manufacture such a counterbalance and then affix it to the TGA. This simplifies the manufacturing process.

A first PZT and a corresponding pseudo feature as disclosed herein mounted at or near the gimbal, may be combined with a second PZT actuator located proximal of the first PZT such as on the baseplate, making for a tri-stage actuated (TSA) design in which the second PZT provides finer movement of the head slider than does the voice coil motor, and the first PZT provides even finer movement still. The second PZT at the baseplate may be combined with either a third PZT opposite the second PZT with the second and third PZTs moving the load beam in push-pull fashion, or a second pseudo feature may be provided on the baseplate generally opposite the second PZT in order to balance out that PZT. A suspension may thus be a TSA suspension having two PZTs located at different longitudinal locations on the load beam, such as one PZT at the baseplate and one PZT on the TGA, with each PZT being balanced out by a respective pseudo feature laterally opposite to its associated PZT.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION OF THE PREFERRED EMBODIMENTS

Figure 1:
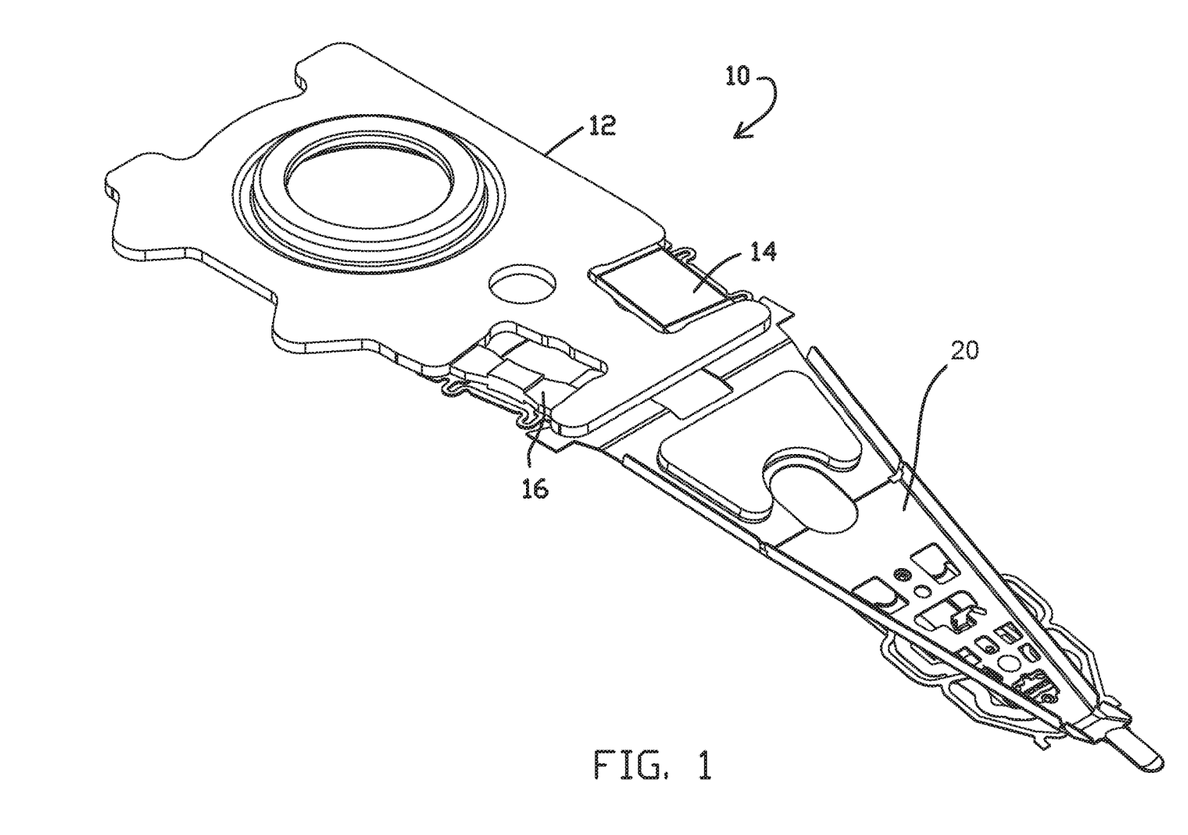
FIG. 1 is a top oblique view of tri-stage actuated suspension having a single PZT at the baseplate and a pseudo feature associated therewith, according to a first illustrative embodiment of the invention.

FIG. 1 is a top oblique view of tri-stage actuated suspension 10 having a single PZT 14 at the baseplate 12 and a pseudo feature 16 associated therewith, according to a first illustrative embodiment of the invention. Expansion and contraction of the PZT 14 moves load beam or beam 20 of suspension 10, and more specifically, rotates the entire load beam 20. Ideally, pseudo feature 16 balances out the mass, mass distribution, and stiffness of PZT 14. Pseudo feature 16 could be manufactured separately and then affixed to baseplate 12 such as by laser welding or by adhesive. Pseudo feature 16 could also be partly or wholly manufactured integrally with baseplate 12. Because baseplate 12 is typically made from stainless steel (SST), pseudo feature could be unitarily formed with baseplate 12 from a single piece of stainless steel. Etching or laser ablation could create areas of greater and lesser thickness and width within pseudo-structure 16. Furthermore, laser treatment could locally alter the mechanical properties of the stainless steel within pseudo feature 16, such as creating locally softer areas, to help fine tune the properties of pseudo feature 16.

Figure 2:
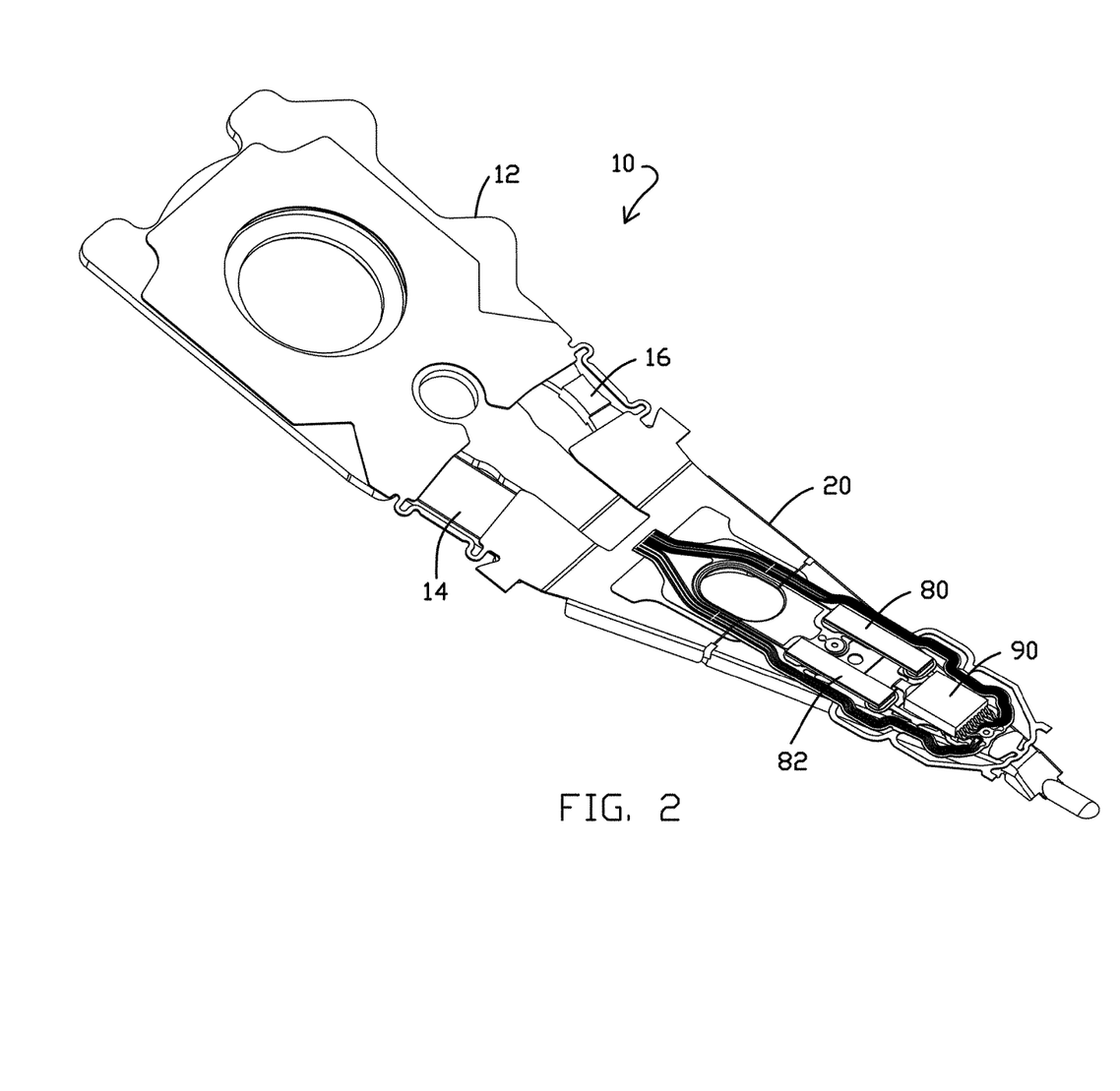
FIG. 2 is bottom oblique view of the suspension of FIG. 1.

FIG. 2 is bottom oblique view of the suspension 10 of FIG. 1. Two PZTs 80/82 on opposite lateral sides of the suspension act in push-pull fashion on the gimbal to rotate head slider 90. Head slider 90 contains a magnetic read transducer and a magnetic write transducer in order to respectively read data from, and write data to, the disk drive platter (not shown). Only part of the electrical circuit traces are shown; in reality, the electrical circuit traces would normally extend from head slider 90 to beyond baseplate 12, i.e., to the upper left of baseplate 12 in the figure, defining a tail region of the circuit.

Figure 3:
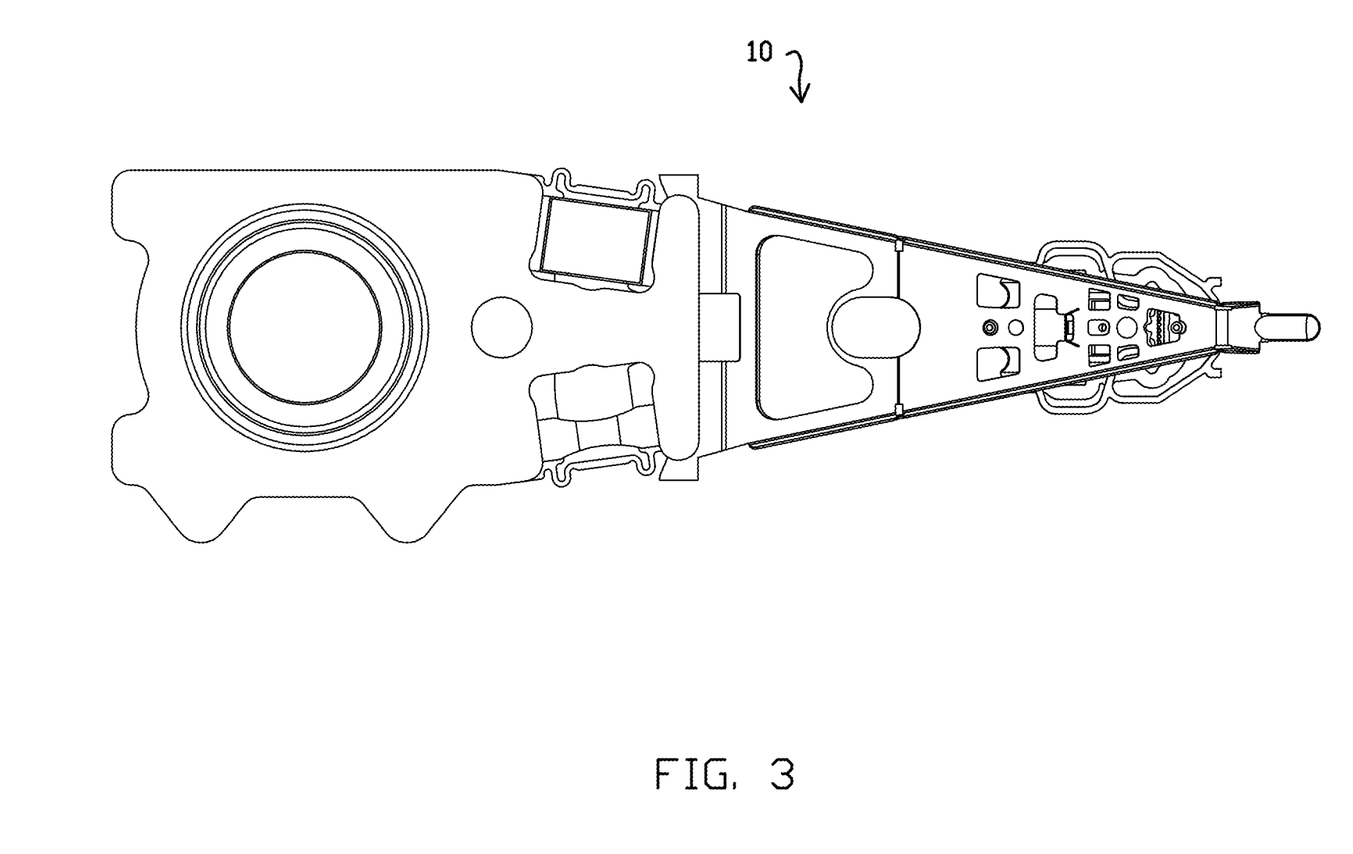
FIG. 3 a top plan view of the suspension of FIG. 1.

FIG. 3 a top plan view of the suspension 10 of FIG. 1.

Figure 4:
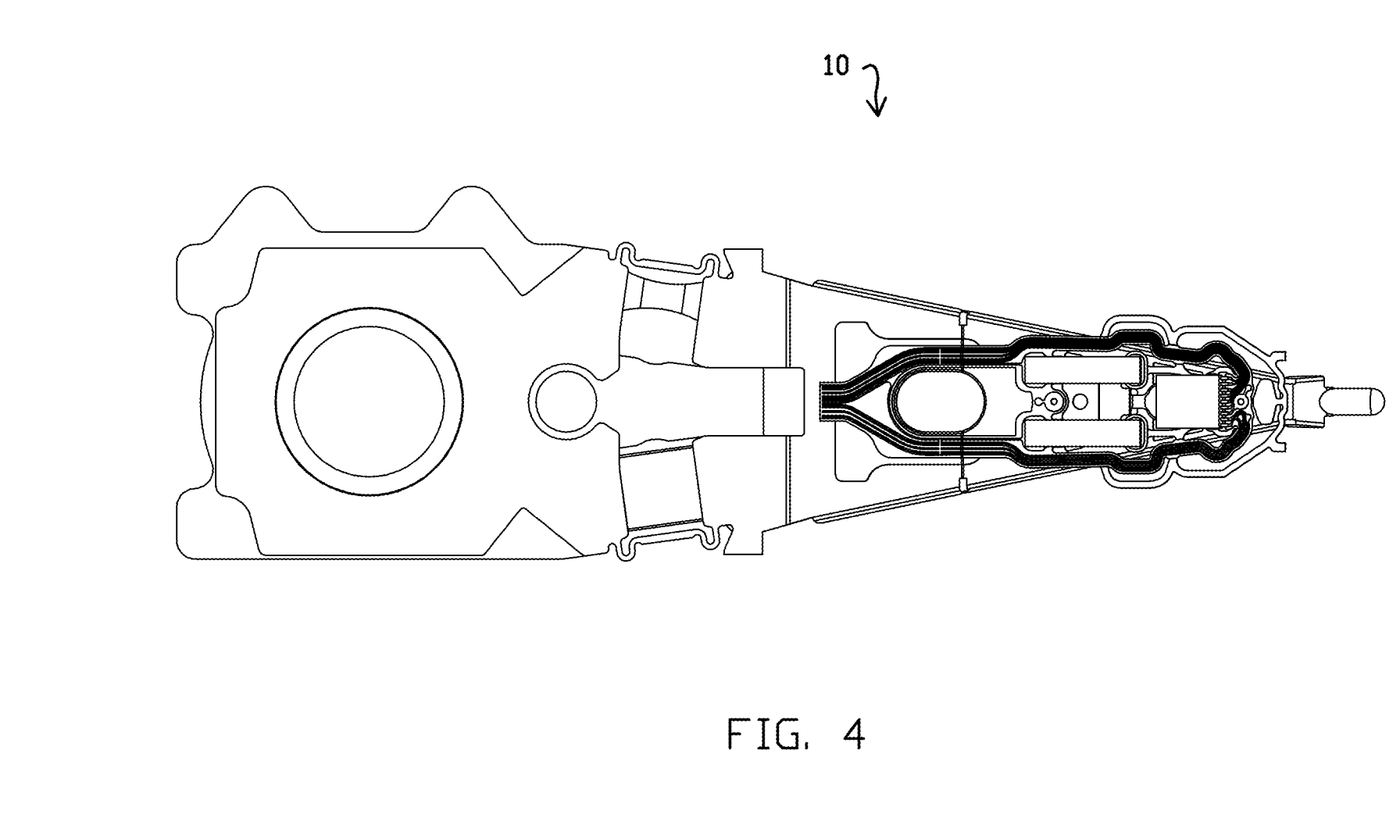
FIG. 4 is a bottom plan view of the suspension of FIG. 1.

FIG. 4 is a bottom plan view of the suspension 10 of FIG. 1.

Figure 5:
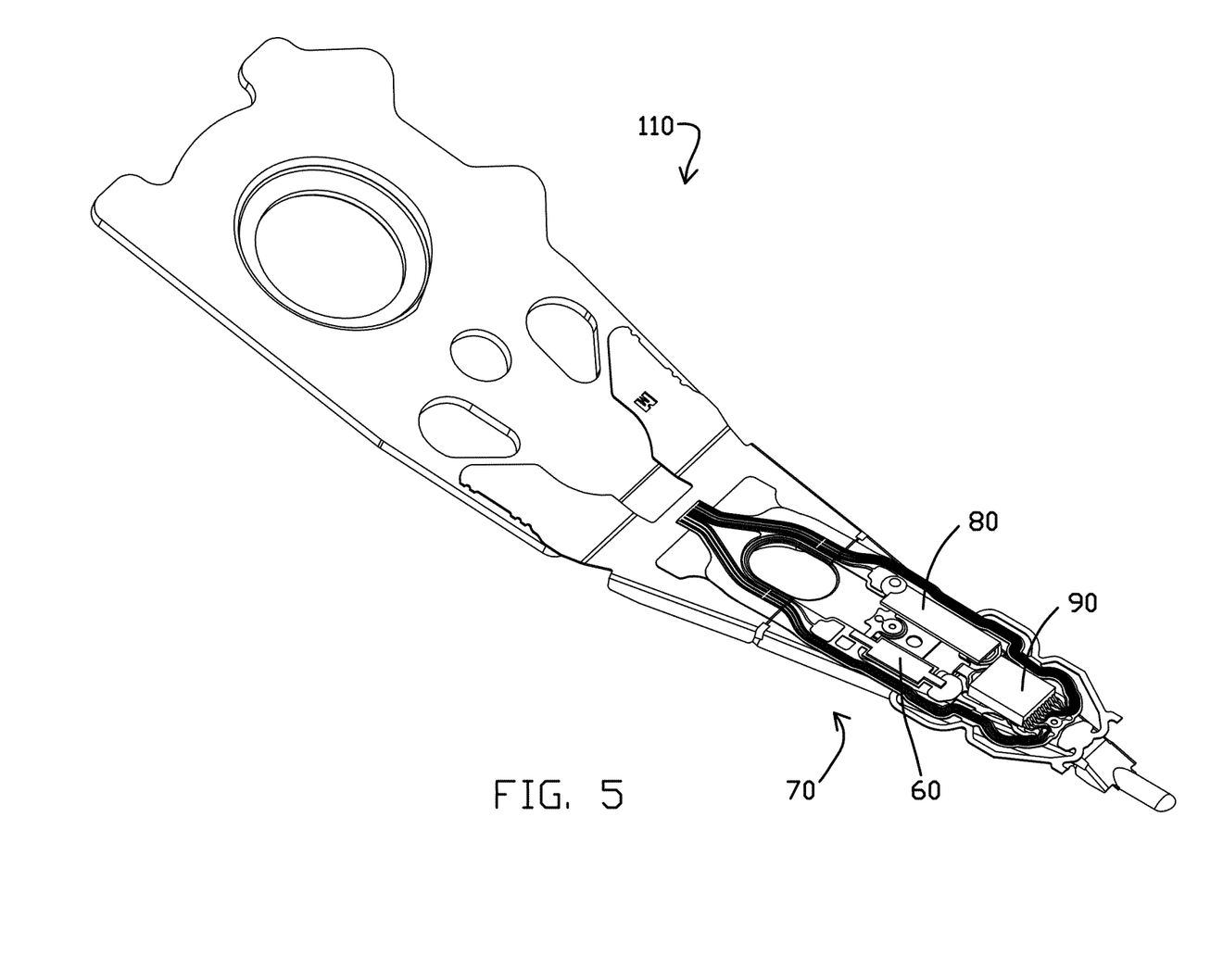
FIG. 5 is a bottom oblique view of a GDA suspension having a single PZT on the TGA and a pseudo feature associated therewith, according to a second illustrative embodiment of the invention.
Figure 9:
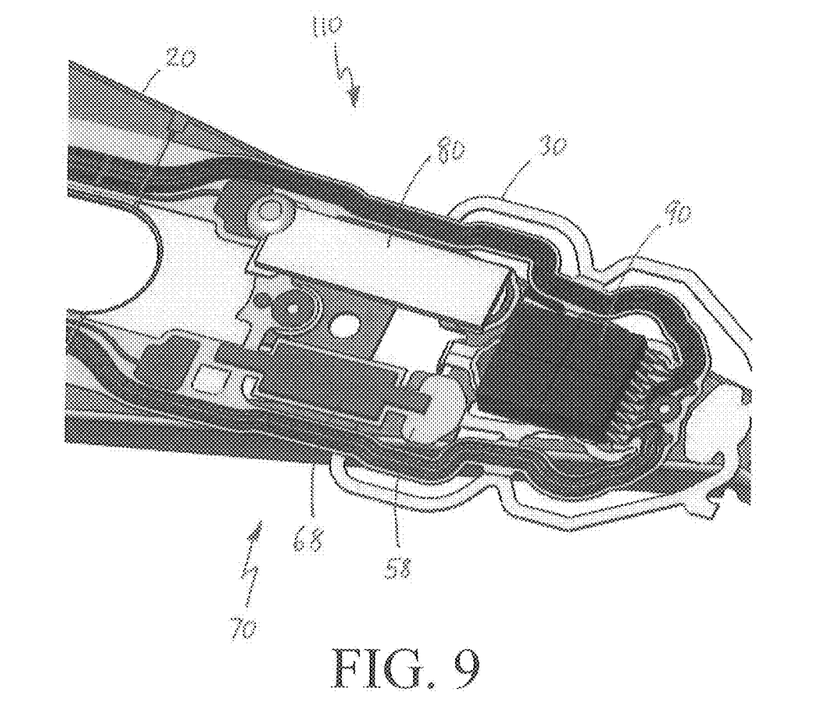
FIG. 9 is a closeup of the suspension of FIG. 5 presented in color for clarity of illustration of the constituent components and layers.

FIG. 5 is a bottom oblique view of a GDA suspension 110 having a single PZT 80 on the TGA 195 and a pseudo feature 70 associated with PZT 80, according to a second illustrative embodiment of the invention. FIG. 9 is a closeup of the suspension of FIG. 5 presented in color for clarity of illustration of the constituent components and layers.

Figure 6:
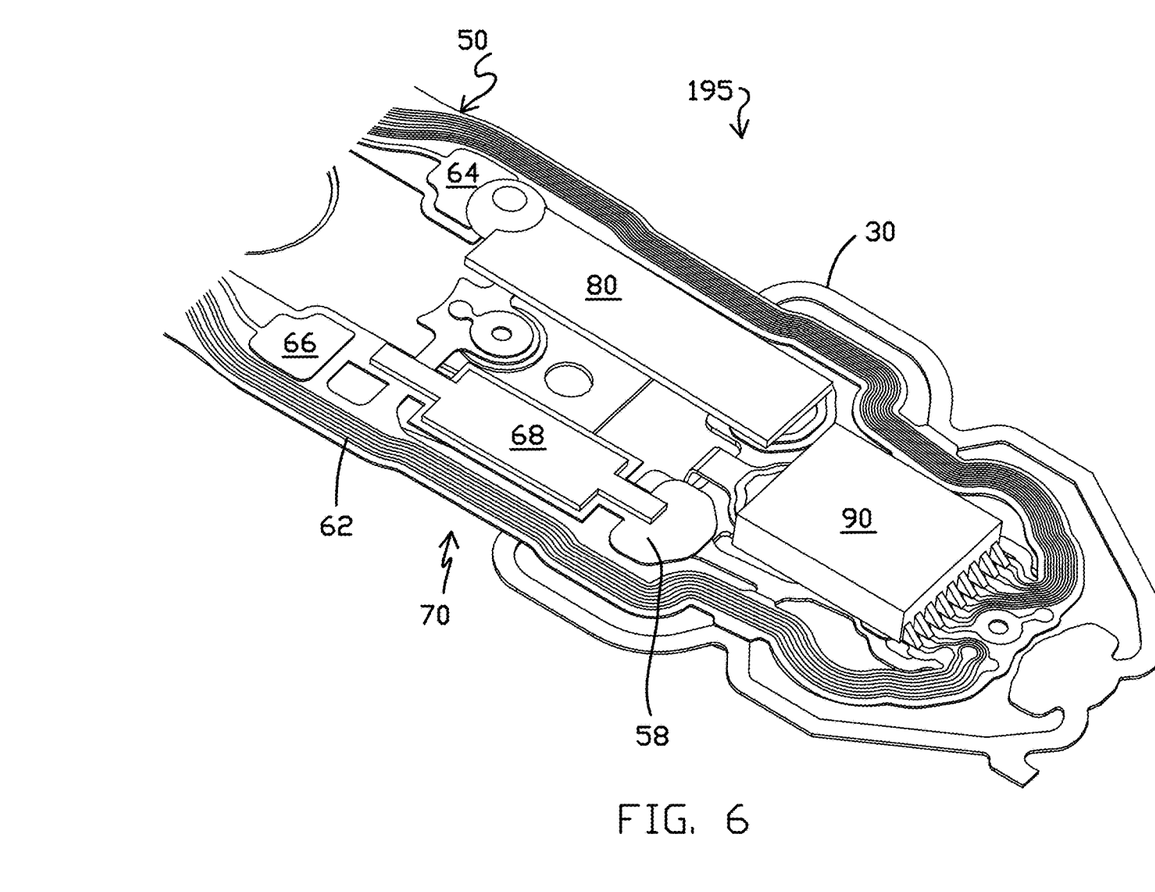
FIG. 6 is a closeup view of the TGA of the suspension of FIG. 5.
Figure 10:
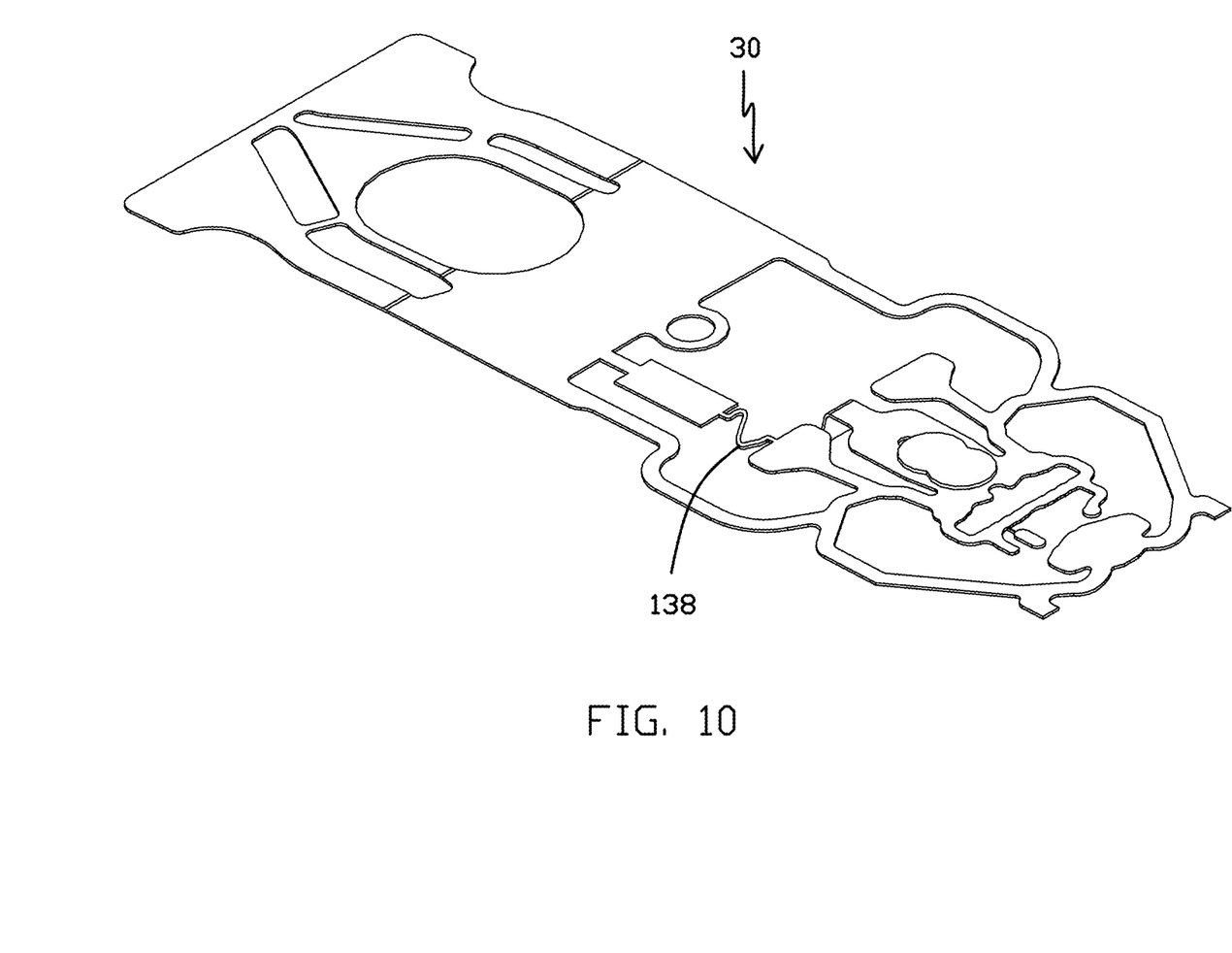
FIG. 10 is an oblique view of a metal base layer having an integrally formed spring.

FIG. 6 is a closeup view of the TGA 195 of the suspension 110 of FIG. 5. TGA 195 includes flexure gimbal made from the stainless steel (SST) layer 30, polyimide layer 50, and electrical circuit traces 62 which carry information including data to and from head slider 90. Copper contact pad 64 carries the driving or activation voltage for PZT 80 which causes PZT 80 to expand or contract lengthwise, thus finely positioning head slider 90. A conductive bridge 86 typically comprising conductive epoxy carries the PZT driving voltage from copper pad 64 to the top electrode of PZT 80. An unused copper pad 66 laterally opposite copper pad 64 provides symmetry to copper pad 64. A pseudo feature 70 acts as a counterbalance to PZT 80, ideally balancing out the mass, mass distribution, and stiffness of PZT 80. Pseudo feature 70 can include a copper portion 68 made from the conductive layer, and a polyimide portion 58 made from insulative layer 50. Pseudo feature 70 could also include a portion made from stainless steel base layer 30 as shown in FIG. 10. Pseudo feature 70 could also include coverlayer coating (not shown) of the type normally used for insulation and corrosion protection for the otherwise exposed copper layer of a suspension. In generally, therefore, pseudo feature 70 is integrally formed with trace gimbal assembly 195, and comprises portions(s) of one or more of base metal layer 30, insulating layer 50, conductive layer 60, and coverlayer.

Figure 7:
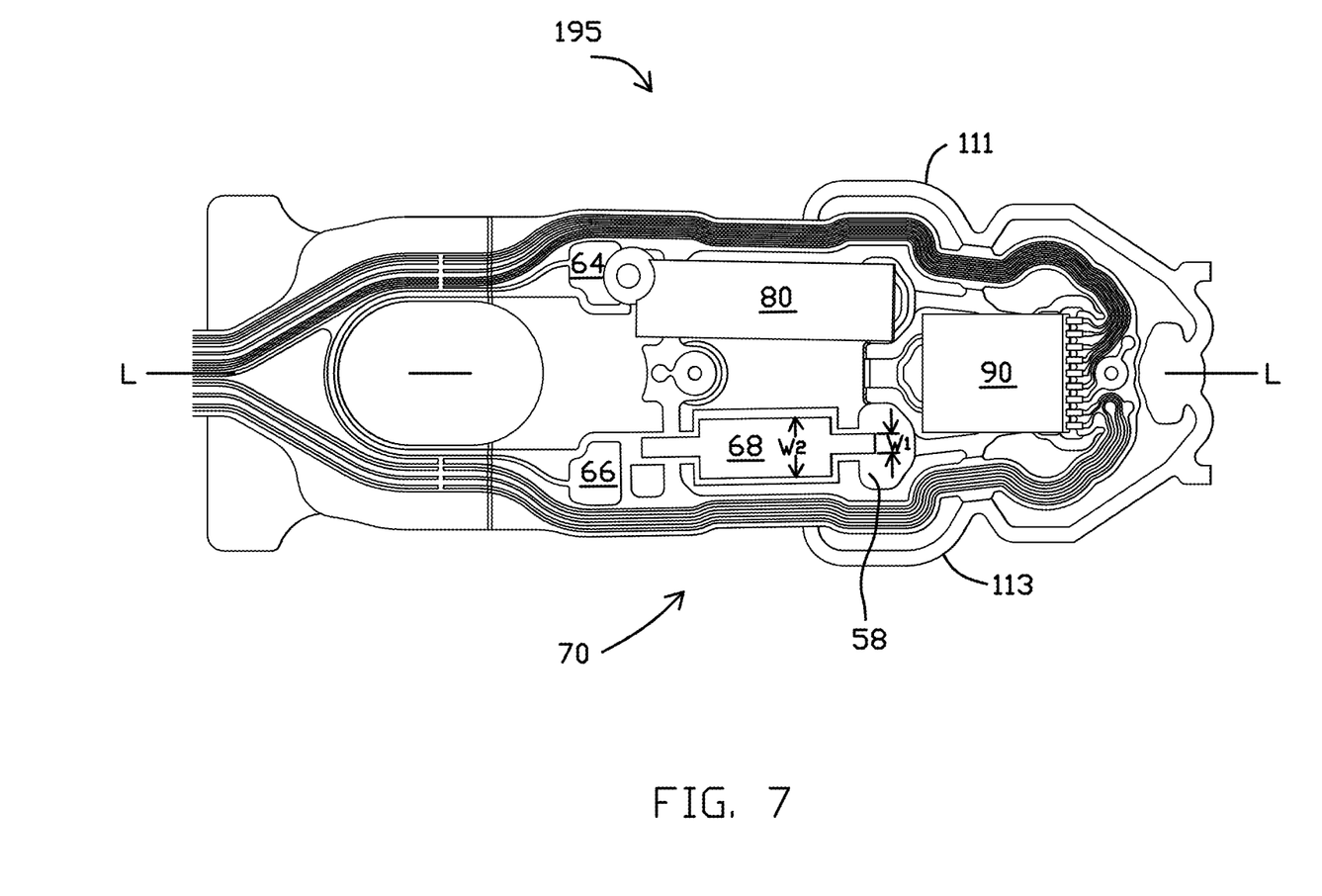
FIG. 7 is a bottom plan view of the TGA of FIG. 6.

FIG. 7 is a bottom plan view of the TGA 195 of FIG. 6, explicitly showing PZT 80 on a first lateral side 111 of TGA 195 and hence of suspension 110, and the pseudo feature 70 on the second and opposite lateral side 113 of TGA 195 and hence of suspension 110. Central longitudinal axis L-L divides TGA 195 into first lateral side 111 and second lateral side 113. Pseudo feature 70 can include a metal part, made from either the stainless steel layer or the copper layer 60, that has selectively wider and narrower portions as desired in order to "dial in" the correct mass, mass distribution, and stiffness. In the embodiment shown, copper portion 68 is positioned directly opposite PZT 80 and has two narrower sections having width $W_1$ on either side of a wider section having width $W_2$. The wider section provides mass, and the narrower sections reduce the overall stiffness of the structure. For example, the widest portion(s) can have a width $W_2$ that is at least three times the width $W_1$ of the narrower portion(s). If the copper layer is used to contribute in significant part to the mass of the pseudo feature 70, then typically the widest part(s) of copper portion 68 would be at least three times the average width of the copper signal traces 62 that carry data to and from head slider 90, and would have a mass that is at least 10% of the mass of PZT 80. Copper portion 68 is preferably electrically isolated from any circuit traces carrying electrical signals in order to avoid degrading the dynamic performance of those circuit traces.

Figure 8:
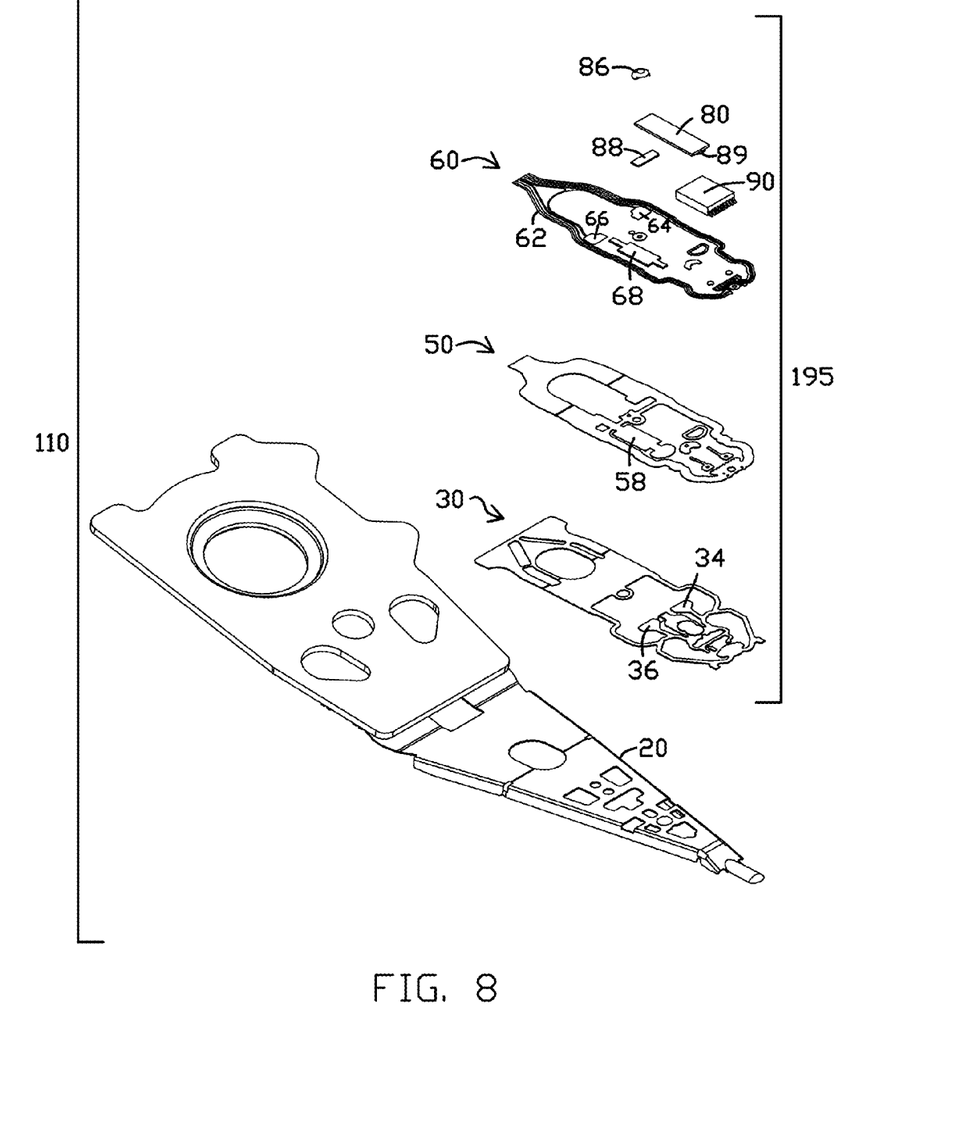
FIG. 8 is an exploded bottom view of the suspension of FIG. 5.

FIG. 8 is an exploded bottom view of the suspension of FIG. 5 including TGA 195. TGA 195 includes base metal layer 30 which is typically stainless steel, and which defines the flexure gimbal. Stainless steel layer 30 includes both first pad 34 to which PZT 80 is affixed and through which PZT 80 acts to move head slider 90, and also includes a second pad 36 that generally mirrors first pad 34 for the purpose of providing symmetry thereto and therefore has no PZT attached directly to it.

Insulative layer 50 is typically polyimide. Polyimide layer 50 includes a portion 58 that defines part of pseudo feature 70. Polyimide portion 58 supports copper portion 68. In the embodiment as illustrated, pseudo feature 70 is mostly defined by insulative layer portion 58 and conductive layer portion 68. If an additive manufacturing process is used to make TGA 195, then polyimide portion 58 is laid down at the same time as the rest of polyimide layer 58. If a subtractive manufacturing process is used, then polyimide portion 58 starts off as unitary with the rest of polyimide layer 50, with a removal process such as etching removing the unwanted portions of that layer.

Conductive layer 60 is typically copper or copper alloy (hereafter, generally "copper"). Conductive layer 60 includes copper electrical circuit traces 62, copper pads 64 and 66, and copper portion 68 of pseudo feature 70. If an additive manufacturing process is used to make TGA 195, then copper portion 68 is laid down at the same time as the rest of copper layer 60. If a subtractive manufacturing process is used, then copper portion 68 starts off as unitary with the rest of copper layer 60, with a removal process such as etching removing the unwanted portions of that layer. Theoretically the copper portion 68 could be made to be thicker or thinner than other portions of copper layer 60 such as the circuit traces 62; in practice due to manufacturing consideration, however, it is expected that copper portion 68 would have nominally the same thickness as the rest of copper layer 60 including circuit traces 62.

Typically, a cover layer or coverlay (not shown) is deposited over at least the exposed copper portions of TGA 195 in order to electrically insulate the electrical circuit traces and pads, and to prevent corrosion of the copper. Portions of the cover layer could form part of the pseudo feature. In general, therefore, the counterbalance 70 includes one or more of stainless steel layer 30, polyimide layer 50, copper layer 60, and coverlayer. For purposes of this specification and the appended claims, any coverlayer that is part of the pseudo feature 70 and which is laid down at the same time as the standard coverlayer over electrical traces 62, is considered to be integrally formed with the TGA.

Areas 88 and 89 of adhesive such as epoxy affix PZT 80 to the suspension, and conductive adhesive 86 electrically bridges from copper pad 64 to the top surface of PZT 80 which defines the driving voltage electrode of that PZT.

Suspension 110 thus has a piezoelectric device 80 on a first lateral side of the suspension and more specifically one on a first lateral side of the TGA 195, and a pseudo feature or counterbalance 70 on a second and opposite lateral side of the TGA opposite the piezoelectric device, the counterbalance 70 counterbalancing to the extent practical the mass and stiffness of piezoelectric device 80. Counterbalance 70 is integrally formed with TGA 195; the counterbalance is not separately formed and then later affixed to the suspension such as using adhesive. Adhesives create potential contamination issues within the disk drive suspension clean room assembly environment, so minimizing the use of adhesives helps to decrease manufacturing complexity and cost, and to increase the reliability of the disk drive assembly.

For purposes of this specification and the appended claims, unless the context otherwise makes clear, when it is stated that the counterbalance 70 partially or completely counterbalances the mass, mass distribution, and/or stiffness of PZT 80, the weight and characteristics of the adhesives 86, 88, and 89 are considered as being part of PZT 80, such that the counterbalancing accounts for not only PZT 80 by itself but also the adhesives and any other components of features associated with the PZT 80.

In a preferred embodiment the PZT 80 has no separately formed counterbalance at all, with all of the counterbalance to PZT 80 being provided by the integrally formed pseudo-symmetry feature 70. Of course, it is not practical or not possible to counterbalance PZT 80 with complete and total precision. Thus, the integrally formed pseudo feature or counterbalance 70 preferably has a mass of at least 50% of the mass of PZT 80. Additionally, counterbalance 70 preferably has a stiffness that is within at least 50% of the stiffness of PZT 80. More preferably, counterbalance 70 is positioned in generally mirror relation to PZT 80 and has a mass that is within 30% of PZT 80, and more preferably within 10% of PZT 80.

There will always be at least some small amount of variability from one suspension to the next in the mass and position of PZT 80 and its associated adhesives. Accordingly, it would be desirable to be able to finely control the mass and mass distribution of pseudo-structure 70. The mass and mass distribution of pseudo feature 70 can be precisely trimmed user laser ablation, such as by micromachining using a femtosecond laser. Using femtosecond lasers for micromachining is discussed for example in Liqiu Men et al., "Femtosecond Laser Trimmed Fiber Taper for Simultaneous Measurement of Axial Strain and Temperature," IEEE PHOTONICS TECHNOLOGY LETTERS, Vol. 23, No. 5 (Mar. 1, 2011), which is hereby incorporated by reference for its teachings of micromachining using lasers. Additionally, lasers such as femtosecond lasers could be used to locally alter characteristics of the material such as making it softer and less stiff.

It is possible that some other device such as a temperature sensor, strain gauge, resistive heater, or other sensor or device is separately formed and then adhered to the suspension, with that other device providing at least some of the counterbalance to PZT 80. Thus, in another preferred embodiment, the suspension has no separately formed and later affixed counterbalance to PZT 80 that has a mass that is one quarter or more of the mass of PZT 80.

FIG. 10 is an oblique view of a stainless steel layer or flexure gimbal 30 according to a variant in which the pseudo feature 70 includes a spring 138 integrally formed of the stainless steel layer. In the embodiment shown spring 138 takes the form of a serpentine section of stainless steel. More generally, the pseudo feature could include a spring integrally formed of the stainless steel layer of the flexure such as spring 138 shown, and/or a spring integrally formed of the metal conductive layer. Such a spring could provide a wide stiffness range, so that the stiffness of the pseudo feature could be dialed in to closely match the stiffness of PZT 80. Such a spring 138 could be incorporated into the stainless steel layer 30 shown in FIG. 8.

In another embodiment (not shown) the suspension includes both a first piezoelectric device and an associated pseudo feature such as PZT 80 and associated pseudo feature 70 located on the TGA as shown in FIGS. 5-8, and a second piezoelectric device and associated pseudo-symmetry such as PZT 14 and associated pseudo feature 16 mounted proximal of first PZT 80 such as on baseplate 12 as shown in FIGS. 1-4. Such a suspension would define a tri-stage actuated suspension, with the standard voice coil motor providing coarse position adjustments, second PZT 14 mounted on the baseplate providing medium position adjustments, and first PZT 80 mounted on or at the gimbal providing fine position adjustments. Alternatively, the suspension could have two baseplate-mounted PZTs and no baseplate-mounted pseudo-structure, and one gimbal-based PZT 80 and a corresponding pseudo-structure 70, optionally including integrally formed spring 138.

It will be understood that the terms "generally," "approximately," "about," and "substantially" as used within the specification and the claims herein allow for a certain amount of variation from any exact dimensions, measurements, and arrangements, and that those terms should be understood within the context of the description and operation of the invention as disclosed herein.

It will further be understood that terms such as "top," "bottom," "above," and "below" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "invention" or "present invention" as used herein should not be construed to mean that only a single invention having a single essential element or group of elements is presented. Similarly, it will also be appreciated that the term "present invention" encompasses a number of separate innovations which can each be considered separate inventions. The pseudo feature integrally formed on the trace gimbal as disclosed herein could be used in a suspension regardless of whether the suspension is dual stage actuated or tri-stage actuated. Similarly, tri-stage actuation as disclosed herein does not require the use of one or more pseudo features.

Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A dual stage actuated disk drive suspension comprising:
   a beam;
   a trace gimbal assembly (TGA) attached to the beam;
   a single piezoelectric device mounted on the TGA and arranged to move a head slider carried by the TGA; and
   a counterbalance disposed laterally opposite the piezoelectric device, the counterbalance being formed integrally with the TGA and providing counterbalance to the piezoelectric device, wherein the counterbalance includes copper having a width that is at least three times an average width of electrical traces on the suspension that are electrically coupled with the head slider.

2. The suspension of claim 1 wherein the counterbalance has at least a first portion and a second portion, the second portion being at least three times as wide as the first portion and comprising a same material as the first portion.

3. The suspension of claim 1 wherein the counterbalance includes a metal spring integrally formed of at least one of a metal base layer and a conductive layer of the TGA.

4. A dual stage actuated disk drive suspension comprising:
   a beam;
   a trace gimbal assembly (TGA) attached to the beam, the TGA comprising:
      a metal base layer;
      an insulating layer on the metal base layer; and
      a conductive layer on the insulating layer;
      the TGA having a first lateral side and a second lateral side opposite the first lateral side;
   a head slider mounted to the TGA;
   a first piezoelectric device mounted on the first lateral side of the TGA and arranged for moving the head slider, the first piezoelectric device having a mass;
   wherein:
   the suspension does not have a second piezoelectric device that is disposed on the second lateral side of the TGA generally opposite the first piezoelectric device; and
   the suspension includes a counterbalancing mass on the second lateral side of the suspension to balance out the mass of the first piezoelectric device, and having a mass of at least one quarter of the mass of the first piezoelectric device;
   wherein the counterbalancing mass includes copper having a width that is at least three times an average width of electrical circuit traces on the suspension that are electrically coupled with the head slider.

5. The suspension of claim 4 further comprising:
   the counterbalancing mass disposed laterally opposite the first piezoelectric device and having a mass of at least 50% of the mass of the first piezoelectric device, the counterbalancing mass including at least one of the metal base layer, the insulating layer, and the conductive layer, the counterbalancing mass having been formed integrally with the TGA.

6. The suspension of claim 4 wherein the counterbalancing mass includes a metal spring integrally formed of at least one of the metal base layer and the conductive layer.

7. The suspension of claim 5 wherein the counterbalancing mass includes copper that is disposed on the second lateral side of the suspension and positioned directly opposite the first piezoelectric device.

8. The suspension of claim 7 wherein the copper that is disposed on the second lateral side of the suspension positioned directly opposite the first piezoelectric device has a mass that is at least 10% of the mass of the first piezoelectric device.

9. The suspension of claim 7 wherein:
   the conductive layer includes the electrical circuit traces.

10. The suspension of claim 5 wherein the counterbalancing mass has a mass that is within 50% of the mass of the first piezoelectric device and a stiffness that is within 50% of a stiffness of the first piezoelectric device.

11. A dual stage actuated disk drive suspension comprising:
    a beam;
    a trace gimbal assembly (TGA) attached to the beam, the TGA including:
       a metal base layer;
       an insulating layer on the metal base layer; and
       a conductive layer on the insulating layer;
       the TGA including a flexure gimbal for carrying a head slider, and an electrical circuit including electrical traces formed of the conductive layer on the insulating layer for carrying electrical signals to and from the head slider;

a piezoelectric device disposed on the flexure gimbal on a first lateral side of a central longitudinal axis of the suspension; and a pseudo feature disposed on a second and opposite lateral side of the central longitudinal axis and in generally mirror relation to the first piezoelectric device, and having a mass that is within 30% of a combined mass of the piezoelectric device and adhesive attached thereto, the pseudo feature comprising at least one of the metal base layer, the insulating layer, and the conductive layer, and integrally formed with the trace gimbal assembly;

wherein the pseudo feature includes copper having a width that is at least three times an average width of the electrical traces on the suspension that are electrically coupled with the head slider.

12. The suspension of claim 11 wherein the pseudo feature does not include a weight that was formed separately from the TGA and later affixed to the TGA.

13. The suspension of claim 11 wherein the pseudo feature does not include a weight that was formed separately from the TGA and later affixed to the TGA, and that has a mass that is greater than 50% of a mass of the piezoelectric device.

14. The suspension of claim 11 wherein the pseudo feature includes copper and polyimide.

15. The suspension of claim 11 wherein the pseudo feature includes stainless steel and copper.

16. The suspension of claim 11 wherein the pseudo feature has a mass that is within 30% of a combined mass of the piezoelectric device and adhesive affixing the piezoelectric device to the flexure gimbal.

17. The suspension of claim 11 wherein:

the piezoelectric device defines a first piezoelectric device; and the suspension further includes a second piezoelectric device that is mounted on the suspension proximal of the first piezoelectric device, the second piezoelectric device arranged to rotate the entire beam.

* * * * *